United States Patent
Ghannam et al.

(10) Patent No.: US 10,475,343 B2
(45) Date of Patent: Nov. 12, 2019

(54) VEHICLE ICE STRIKE PREDICTION

(71) Applicant: Ford Global Technologies, LLC, Dearborn, MI (US)

(72) Inventors: Mahmoud Yousef Ghannam, Canton, MI (US); Aed M. Dudar, Canton, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 237 days.

(21) Appl. No.: 15/598,797

(22) Filed: May 18, 2017

(65) Prior Publication Data

US 2018/0336785 A1 Nov. 22, 2018

(51) Int. Cl.
*B60R 16/02* (2006.01)
*G08G 1/16* (2006.01)
(Continued)

(52) U.S. Cl.
CPC .............. *G08G 1/162* (2013.01); *B60W 10/04* (2013.01); *B60W 10/18* (2013.01); *B60W 10/20* (2013.01); *B60W 30/09* (2013.01); *B60W 30/0956* (2013.01); *B60W 30/18163* (2013.01); *G05D 1/0055* (2013.01); *G05D 1/0088* (2013.01); *G05D 1/0214* (2013.01); *G05D 1/0248* (2013.01); *G08G 1/04* (2013.01); *G08G 1/042* (2013.01); *G08G 1/167* (2013.01); *H04L 67/12* (2013.01); *B60W 2420/42* (2013.01); *B60W 2420/52* (2013.01); *B60W 2510/18* (2013.01); *B60W 2510/20* (2013.01); *B60W 2520/105* (2013.01); *B60W 2550/10* (2013.01); *B60W 2550/12* (2013.01); *B60W 2550/302* (2013.01); *B60W 2550/308* (2013.01);
(Continued)

(58) Field of Classification Search
CPC .......... B60R 16/02; G01W 1/14; G01W 1/02; B60W 40/06; B60W 30/095; G08B 19/02; G08B 1/16
USPC ........................................................... 701/41
See application file for complete search history.

(56) References Cited

U.S. PATENT DOCUMENTS 6,431,001 B1 * 8/2002 Tsuzuki ................. G01N 29/12
73/436
8,502,653 B2 * 8/2013 Tsuzuki .............. G01S 7/52004
340/425.5

(Continued)

FOREIGN PATENT DOCUMENTS

DE           10013393 A1    10/2002
DE       102012210255 A1    12/2013
(Continued)

OTHER PUBLICATIONS

GB Search Report dated Oct. 30, 2018 re GB Appl. No. 1807946.7.

*Primary Examiner* — Tan Q Nguyen
(74) *Attorney, Agent, or Firm* — Frank A. MacKenzie; Bejin Bieneman PLC

(57) ABSTRACT

A computer includes a processor that is programmed to identify, in a first vehicle, a second vehicle based on first vehicle sensor data. The processor is programmed to determine, based on at least one of the sensor data and additional environmental data, a risk of ice from the second vehicle striking the first vehicle. The processor is further programmed to cause an action in the first vehicle based on the determined risk.

20 Claims, 5 Drawing Sheets

(51) Int. Cl.

| | |
|---|---|
| *B60W 10/04* | (2006.01) |
| *B60W 10/18* | (2012.01) |
| *B60W 10/20* | (2006.01) |
| *B60W 30/09* | (2012.01) |
| *B60W 30/095* | (2012.01) |
| *B60W 30/18* | (2012.01) |
| *G05D 1/00* | (2006.01) |
| *G05D 1/02* | (2006.01) |
| *H04L 29/08* | (2006.01) |
| *G08G 1/04* | (2006.01) |
| *G08G 1/042* | (2006.01) |

(52) U.S. Cl.
CPC . *B60W 2550/406* (2013.01); *B60W 2550/408* (2013.01); *B60W 2710/18* (2013.01); *B60W 2710/20* (2013.01); *B60W 2720/106* (2013.01); *B60W 2750/302* (2013.01); *B60W 2750/308* (2013.01); *B60W 2750/40* (2013.01); *G08G 1/163* (2013.01)

(56) References Cited

U.S. PATENT DOCUMENTS

| | | |
|---|---|---|
| 8,816,876 B2 | 8/2014 | Jones et al. |
| 2015/0253775 A1* | 9/2015 | Jacobus ............... G05D 1/024 701/23 |
| 2018/0208196 A1 | 7/2018 | Kurata |

FOREIGN PATENT DOCUMENTS

| | | |
|---|---|---|
| DE | 102012224479 A1 | 7/2014 |
| JP | 2010108371 A | 5/2010 |

\* cited by examiner

VEHICLE ICE STRIKE PREDICTION

BACKGROUND

Environmental conditions such as snow, freezing rain, etc. can cause ice buildup on and/or around a vehicle body. A chunk of built up ice or snow may detach and strike another vehicle. For example, due to wind, lateral acceleration, etc. the ice may detach and fall from the vehicle. An ice strike to a second vehicle may damage the second vehicle. For example, a vehicle window, a vehicle sensor, etc. may be damaged because of an ice strike.

DETAILED DESCRIPTION

Introduction

Figure 1:
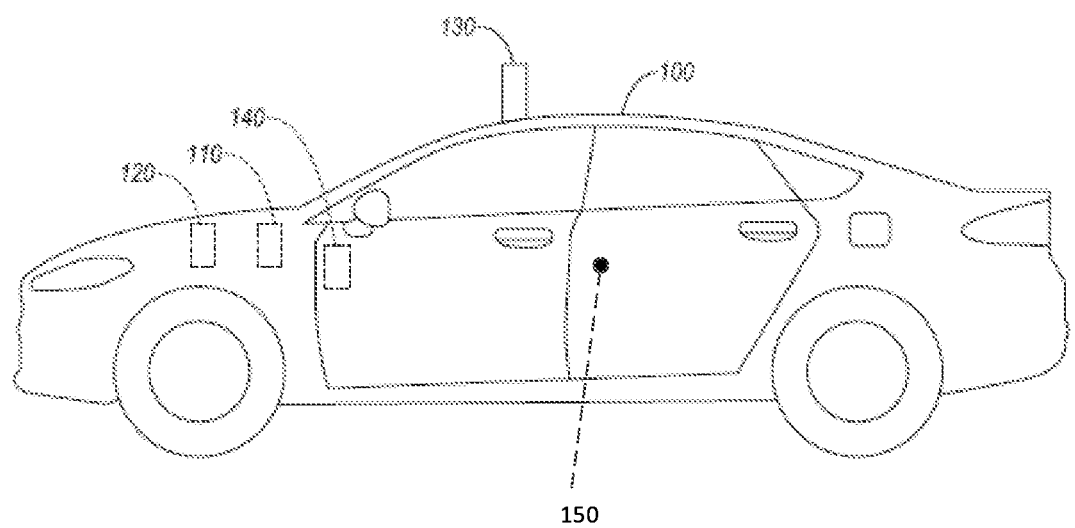
FIG. 1 is a diagram showing a vehicle system.

Disclosed herein is a computer including a processor that is programmed to identify, in a first vehicle, a second vehicle based on first vehicle sensor data. The processor is programmed to determine, based on at least one of the sensor data and additional environmental data, a risk of ice from the second vehicle striking the first vehicle. The processor is further programmed to cause an action in the first vehicle based on the determined risk.

The action in the first vehicle may include changing a first vehicle driving lane.

The processor may be further programmed to transmit a message to the second vehicle based on the determined risk.

The message may include at least one of a maximum recommended acceleration and a maximum recommended threshold for the second vehicle.

The action in the first vehicle may include broadcasting a message including location, movement direction, and speed of the second vehicle upon determining that the determined risk exceeds a predetermined threshold.

The action in the first vehicle may include closing a protective cover of a first vehicle sensor.

Determining the risk may further depend on a location, a movement direction, and a speed of the second vehicle.

The processor may be further programmed to determine the risk by identifying ice attached to the second vehicle based on the sensor data, and estimating a trajectory of the ice.

The environmental data may include weather data.

The processor may be further programmed to determine the risk by determining whether the second vehicle comes from a snowy area based on weather data, a second vehicle location, a second vehicle movement direction, a second vehicle speed, and map data.

The processor may be further programmed to detect ice striking the first vehicle based on the sensor data.

Further disclosed herein is a method comprising identifying, in a first vehicle, a second vehicle based on first vehicle sensor data, and determining, based on at least one of the sensor data and additional environmental data, a risk of ice from the second vehicle striking the first vehicle. The method further includes causing an action in the first vehicle based on the determined risk.

The action in the first vehicle may include changing a first vehicle driving lane.

The method may further include transmitting a message to the second vehicle based on the determined risk, the message including at least one of a maximum recommended acceleration and a maximum recommended threshold for the second vehicle.

The action may include broadcasting a message including location, movement direction, and speed of the second vehicle upon determining that the determined risk exceeds a predetermined threshold.

The action in the first vehicle may include closing a protective cover of a first vehicle sensor.

The method may further include determining the risk further depends on a location, a movement direction, and a speed of the second vehicle.

Determining the risk further may further include identifying ice attached to the second vehicle based on the sensor data, and estimating a trajectory of the ice.

The environmental data may include weather data.

Determining the risk may further include determining whether the second vehicle comes from a snowy area based on weather data, a second vehicle location, a second vehicle movement direction, a second vehicle speed, and map data.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

Exemplary System Elements

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI 140). A vehicle 100 has a geometrical center point 150, e.g., points at which respective longitudinal and lateral center lines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles 200, 260, e.g., via a vehicle-to-vehicle communication network. The V-to-V communication network represents one or more mechanisms by which the computers 110 of vehicles 100 may communicate with other vehicles 200, 260, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

The sensors 130 may include a variety of devices known to provide data to the computer 110. For example, the sensors 130 may include Light Detection And Ranging (LIDAR) sensor(s) 130 disposed on a top of the vehicle 100 that provide relative locations, sizes, and shapes of other vehicles surrounding the vehicle 100, e.g., the second and third vehicles 200, 260 travelling in front of, next to, and/or behind of the vehicle 100 (see FIGS. 2A-2C). As another example, one or more radar sensors 130 fixed to vehicle 100 bumpers may provide relative locations of the second vehicles 200 travelling in front and/or rear of the vehicle 100.

Further, the sensors 130 may include camera sensor(s) 130, e.g. front view, side view, etc., providing images from an area surrounding the vehicle 100. For example, the computer 110 may be programmed to receive image data from the camera sensor(s) 130 and to implement image processing techniques to detect lane markings 220, lane(s) 210a, 210b, 210c, and other objects such as vehicles 200, 260. The computer 110 may be further programmed to determine a current driving lane 210a of the vehicle 100, e.g., based on (Global Positioning System) GPS coordinates and/or detected lane markings 220.

Based on data received from the sensors 130, the computer 110 may determine a relative distance, speed, etc. of other vehicles 200 relative to the vehicle 100. As another example, the computer 110 may be programmed to receive data including relative speed, location coordinates, and/or direction of other vehicles 200 via the wireless communication network. For example, the computer 110 may receive such data from GPS sensors disposed in other vehicles 200 that provides geographical coordinates, movement direction, etc., of the second vehicles 200.

The vehicle 100 computer 110 may be programmed to detect objects attached to other vehicles 200, 260 based on data received from, e.g., LIDAR sensors 130, radar sensor3 130, and/or camera sensors 130. For example, the computer 110 may be programmed to detect ice 230 on and/or around an exterior of a second vehicle 200 exterior. In one example, the computer 110 may be programmed to determine a shape and/or size of the ice 230 based on the sensor 130 data received from a LIDAR sensor 130. Additionally, the computer 110 may be programmed to detect a movement of a piece of ice 230 relative to the vehicle 200 which is typically an indication of detachment from the vehicle 200. The computer 110 may be programmed to detect a change in position of the ice 230 relative to the vehicle 200 based on the sensor 130 data and to determine a movement (detachment) of the ice 230 from the vehicle 200.

A vehicle 100 sensor 130 such as a LIDAR sensor 130 may further include a protective cap that can be actuated to close for protecting the sensor 130 from damage by an ice 230 strike. For example, the sensor 130 may include an actuator 120 such as an electromechanical actuator 120 to close and/or open a protective cap of the sensor 130. A LIDAR sensor 130 may be mounted on a vehicle 100 roof, pillar, etc. and therefore exposed to a risk of ice 230 strike. Thus, advantageously, closing the protective cap of the sensor 130 may protect the sensor 130 from damage. When a sensor 130 protective cap is closed, the sensor 130 does not provide sensor 130 data to the computer 110. The computer 110 may be programmed to transition operation of the vehicle 100 to a semi-autonomous or non-autonomous mode upon closing the protective cap of the sensor 130.

The HMI 140 may be configured to receive information from a user, such as a human operator, during operation of the vehicle. Moreover, an HMI 140 may be configured to present information to the user. Thus, an HMI 140 may be located in the passenger compartment of the vehicle 100. For example, the computer 110 may output information to HMI 140 indicating a vehicle 100 deceleration and/or lane change to prevent a risk of an ice 230 strike.

Figure 2A:
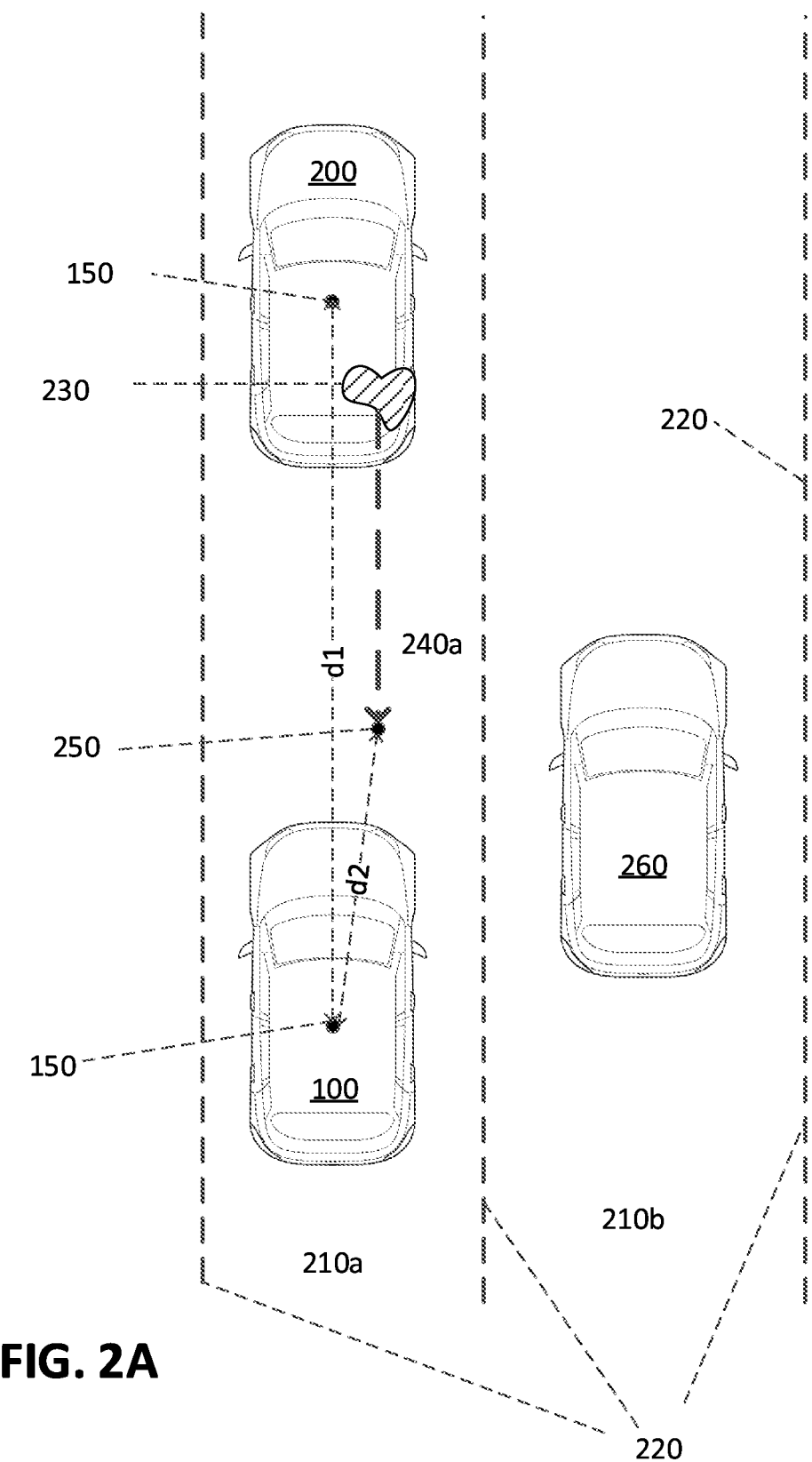
FIG. 2A is a diagram showing multiple vehicles and a trajectory of an ice strike in a same lane.
Figure 2B:
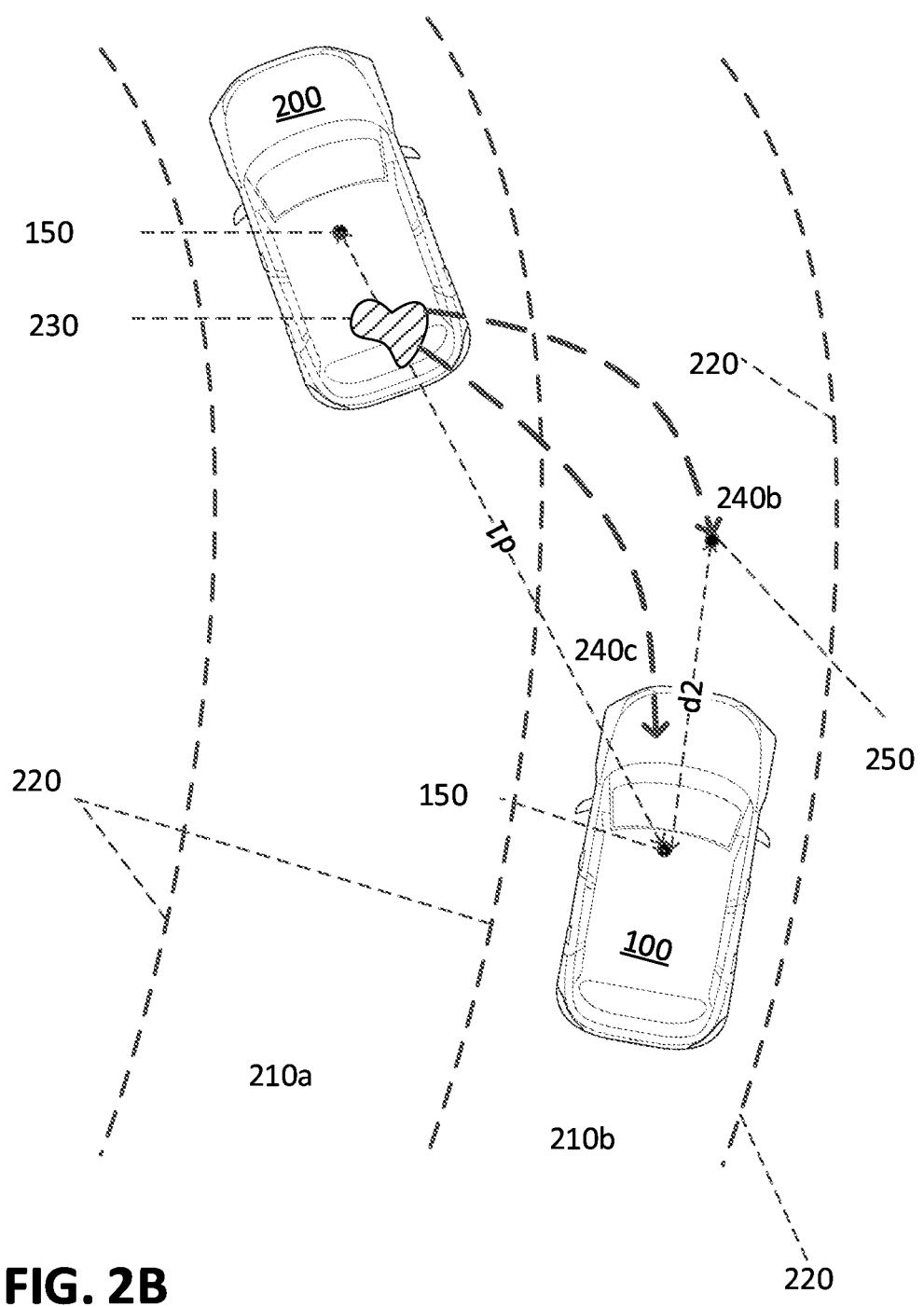
FIG. 2B is a diagram showing multiple vehicles in multiple lanes and a trajectory of an ice strike to a first vehicle in a first lane moving in a same direction as a second vehicle in a second lane.
Figure 2C:
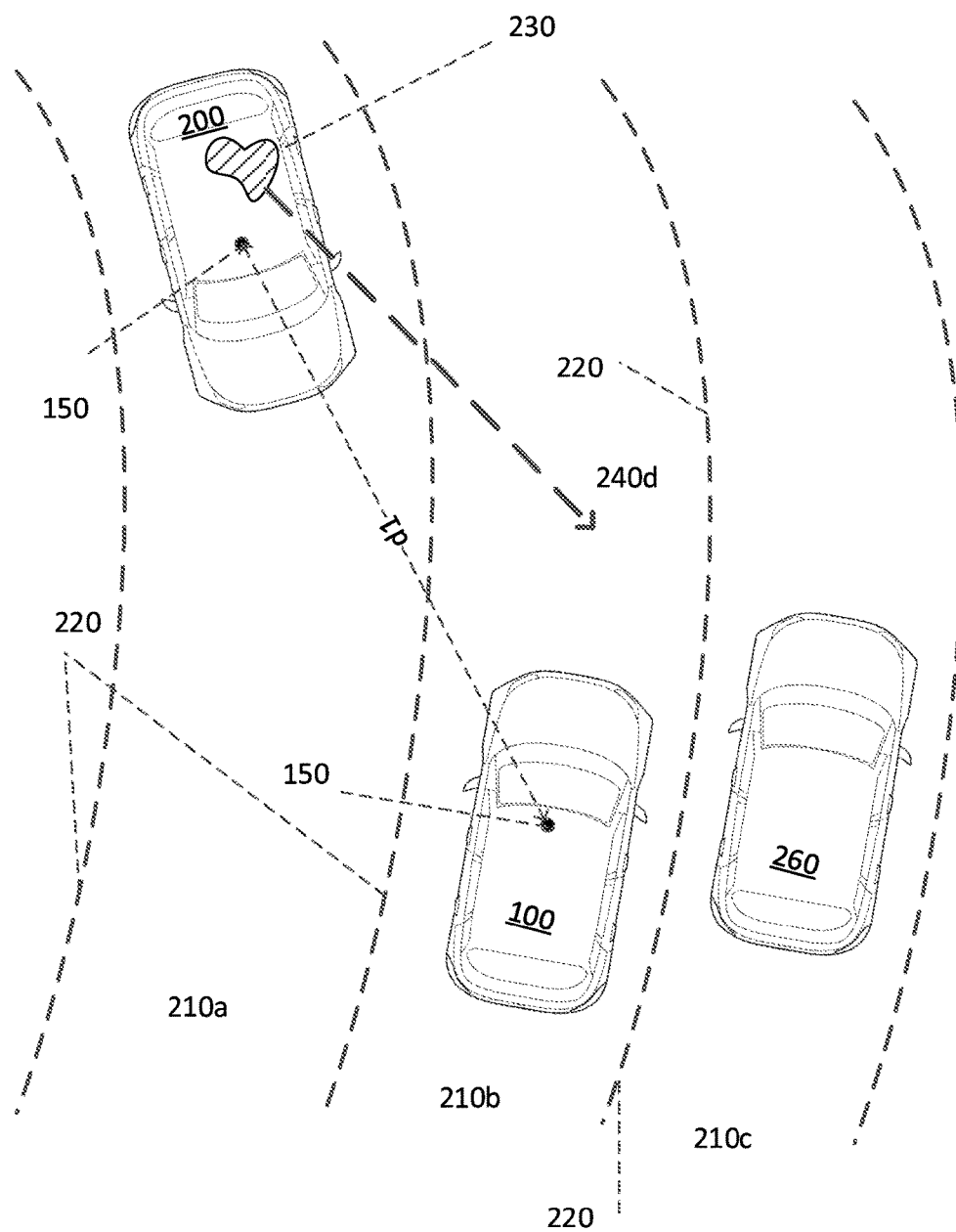
FIG. 2C is a diagram showing multiple vehicles in multiple lanes and a trajectory of an ice strike to a first vehicle in a first lane from a second vehicle moving in an opposite direction in a second lane.

With reference to FIGS. 2A-2C, the computer 110 may be programmed to identify a second vehicle 200 based on the vehicle 100 sensor 130 data. The computer 110 may be programmed to determine a risk of ice 230 from a second vehicle 200 striking the vehicle 100 based on the sensor 130 data and/or environmental data. The computer 110 may then cause an action based on the determined risk. Relative to the vehicle 100, the second vehicle 200 may be located in a same lane 210 and/or another lane 210. The second vehicle 200 may be on a side of, in front of, and/or behind the vehicle 200.

For example, the computer 110 may cause an action by outputting instructions to the vehicle 100 steering actuator(s) 120 based on the determined risk. In one example, the action may include changing the vehicle 100 driving lane 210. Additionally or alternatively, the computer 110 may determine a new route for the vehicle 100 and accordingly output instructions to the vehicle 100 actuators 120, e.g., moving laterally to another lane 210. The computer 110 may output instructions to the vehicle 100 braking actuators 120 to decelerate the vehicle 100. A vehicle 100 LIDAR sensor 130 may be mounted on the vehicle 100 roof, pillar, etc. and may be damaged by an ice 230 strike. Thus, the computer 110 may cause a protective cover of the sensor 130 to close (e.g., by actuating an electromechanical actuator) based on the determined risk of an ice 230 strike.

The computer 110 may be programmed to determine the risk by identifying ice 230 attached to the second vehicle 200 based on the sensor 130 data, and estimating a trajectory 240a, 240b, 240c, 240d of the ice 230, as shown in FIGS. 2A-2C. A trajectory, e.g., a trajectory 240a, 240b, 240c, 240d, in the context of present disclosure refers to an expected or projected movement path of an ice 230 detached from a second vehicle 200 and falling on a ground surface and/or another vehicle, e.g., the vehicle 100, a third vehicle 260, etc. The trajectories 240a, 240b, 240c, 240d may include curves and/or straight lines. A trajectory 240a, 240b, 240c, 240d may include a longitudinal, lateral, and/or vertical movement. A longitudinal movement may refer to a movement parallel to a straight edge of a lane 210, or parallel to a tangent to a closest point of the lane 210 edge where the edge is curved. A lateral movement is perpendicular to a longitudinal movement. A vertical movement may be perpendicular to a ground surface.

The computer 110 may be programmed to estimate the trajectory 240a, 240b, 240c, 240d of the ice 230 based on the vehicle 100 sensor 130 data. The sensor 130 data may include a size, shape, weight of the ice 230; a speed, movement direction, location coordinates, etc. of the second vehicle 200; a lane 210 curvature, etc. The computer 110 may be programmed to estimate the trajectory 240a, 240b, 240c, 240d of the ice 230 using known kinematic techniques. For example, the computer 110 can be programmed to perform a mathematical operation that considers an initial velocity of the ice 230 while detaching from a second vehicle 200, a height of the second vehicle 200, size and/or mass of the ice 230, and a strike location 250. Thus, the computer 110 may be programmed to determine an expected ice 230 strike location 250 based on the above mentioned mathematical operation. The computer 110 may determine the trajectory 240a, 240b, 240c, 240d in form of a three-dimensional equation based on spatial coordinates X, Y, Z of the ice 230. X, Y, and Z represent longitudinal, lateral, and altitude coordinates. An initial state of the trajectory 240a, 240b, 240c, 240d may be further based on a second vehicle 200 speed, acceleration, and location at a time of detachment of ice 230 from the second vehicle 200. An initial state of the trajectory 240a, 240b, 240c, 240d may include initial location, speed, and/or acceleration of the ice 230 at the time of detachment from the vehicle 200.

The risk of an ice strike herein means a value, e.g., specified by a number, indicating a likelihood of an ice 230 colliding with a vehicle 100. In one example, the risk may be assigned to one of a plurality of discrete categories, such as "low", "medium", "high", and "imminent" risk. For example, the computer 110 may actuate the vehicle 100 actuators 120 to cause an action such as a lane change, if the score is "high", i.e., greater than a "medium" risk threshold.

In another example, the score may be defined as numerical percentage value between 0% and 100%. For example, the computer 110 may actuate the vehicle 100 actuators 120 to cause an action when the risk, e.g. 60%, is greater than a risk threshold, e.g., 50%.

With reference to FIG. 2A, the computer 110 may determine the risk of an ice 230 strike based on the expected strike location 250, an expected location of the vehicle 100 at a time of ice 230 landing, the vehicle 100 dimensions, and one or more risk determination thresholds. The computer 110 may determine the expected location of the vehicle 100 at the time of landing of the ice 230 based on ice 230 time of flight that can be determined based on kinematic techniques, and vehicle 100 speed and direction. The risk determination thresholds may be defined relative to a center 150 of the vehicle 100 and vehicle 100 dimensions including length, width and/or height. For example, the risk thresholds may include a "high" risk threshold, e.g., 2 meters from the vehicle 100 center 150, a "medium" risk threshold, e.g., 5 meters from the vehicle 100 center 150, and a "low" risk threshold, e.g., 10 meters from the vehicle 100 center 150. Additionally or alternatively, the computer 110 may be programmed to determine the risk based on shape and/or size of the ice 230. For example, the computer 110 may be programmed to estimate a mass of the ice 230 based on the determined size of the ice 230, and determine the risk based on the estimated mass of the ice 230. Additionally or alternatively, the computer 110 may be programmed to determine the risk based on a differential speed of ice 230 strike, i.e., a speed of ice 230 relative to the vehicle 100 at a time of strike.

As another example for determining the risk of an ice 230 strike, the computer 110 may be programmed to determine the risk based on a distance $d_2$ between an expected ice 230 strike location 250 and the vehicle 100. The ice 230 may detach from the second vehicle 200 roof driving in the same lane 210a as the vehicle 100. The computer 110 may be programmed to determine the expected strike location 250 based on the trajectory 240a, and determine the risk as "low" upon determining that the distance $d_2$ is greater than a predetermined threshold, e.g., 10 meters. The computer 110 may be programmed to determine a "medium" risk when the expected strike location 250 is less than the predetermined threshold but greater than a second threshold, e.g., 2 meters. The computer 110 may be programmed to determine a "high" risk upon determining that the expected strike location 250 is on the vehicle 100 body. The computer 110 may be programmed to determine the strike location 250 based on the first vehicle 100 speed, location, and/or acceleration.

With reference to FIG. 2B, the computer 110 may determine the risk further based on a lane 210a, 210b curvature. For example, the ice 230 may fall from the second vehicle 200 roof driving in the lane 210a and strike a third vehicle 260 driving on the lane 210b. In one example, the computer 110 may be programmed to determine the ice 230 trajectory 240b based on ice 230 size, shape, etc., and the second vehicle 200 speed, acceleration (longitudinal and/or lateral), and/or location. The computer 110 may then determine a strike location 250 with a distance $d_2$ from the vehicle 100 based on the lane 210b curvature, the vehicle 100 location, speed, and/or acceleration. The computer 110 may determine the risk based on the distance $d_2$ and a predetermine threshold, e.g., 10 meters. In another example, the computer 110 may determine an ice 230 trajectory 240c and determine an expected strike location 250 on the vehicle 100. The computer 110 may then determine a "high" risk for ice 230 strike and cause an action, e.g., actuating third vehicle 260 brake actuators 120.

The computer 110 may be further programmed to determine the risk based on a likelihood of ice 230 detachment from the vehicle 200. Additionally or alternatively, the computer 110 may determine the risk based on a combination of a likelihood of ice 230 detachment from the second vehicle 200 and a likelihood of striking the vehicle 100 in case the ice 230 detaches from the second vehicle 200. In one example, the computer 110 may determine the likelihood of ice 230 detachment based on acceleration and/or deceleration of the second vehicle 200, e.g., a lateral acceleration in a curved lane 210, a longitudinal deceleration due to brake operation, etc.

The computer 110 may estimate the trajectory 240a, 240b, 240c, 240d of the ice 230 and/or may determine the risk of ice 230 strike based on environmental data including weather data. For example, the computer 110 may determine "low" risk when outside temperature is above a predetermine threshold, e.g., 25 degrees Celsius. The computer 110 may determine a relationship between a likelihood of ice 230 detachment from the second vehicle 200 and the outside temperature, e.g., a warmer outside temperature may increase a likelihood of ice 230 detachment.

With reference to FIG. 2C, the computer 110 may be programmed to determine the risk by determining whether the second vehicle 200 comes from a snowy area based on weather data, a route of the second vehicle 200, and map data. The computer 110 may be programmed to estimate the risk based on a route of a second vehicle 200. The second vehicle 200 driving an opposite direction may come from a snowy area although the first and second vehicles 100, 200 current location may have a temperature above a predetermined threshold, e.g., 15 degrees Celsius. The computer 110 may be programmed to receive weather data associated with the route of the second vehicle 200 for a predetermined duration of time, e.g. past 6 hours, and determine the risk and/or trajectory of the ice 230 strike based on the received weather data. The computer 110 may be programmed to determine a likelihood of ice 230 buildup based on a change of outside temperature of the vehicle 100 over a predetermined number of hours, e.g., 6 hours, based on e.g., precipitation data and temperature data. The likelihood of ice 230 buildup may be determined in a numerical form, e.g., "low", "medium", and "high". The computer 110 may be programmed to determine a trajectory based on the determined likelihood of ice 230 buildup.

The computer 110 may be programmed to determine the trajectory 240d based on the second vehicle 200 route, speed, acceleration, etc. and/or the lane 10 curvature. Additionally or alternatively, the computer 110 may be further programmed to determine the trajectory 240d based on weather data including wind speed and wind direction. The computer 110 may be programmed to determine an ice 230 detachment from the second vehicle 200 based on deceleration of the second vehicle 200 at the curvature of the lane 210a.

The computer 110 may be programmed to determine the risk further based on an expected location of an ice 230 strike on the vehicle 100 body. For example, a risk associated with an estimated ice 230 strike on a vehicle 100 windshield may be determined to be a higher numerical value, e.g., 90%, compared to a risk, e.g., 70%, associated with an estimated ice 230 strike on a less sensitive vehicle 100 component such as a hood, bumper, etc. Additionally or alternatively, the computer 110 may be programmed to determine a risk associated with an ice 230 strike to the vehicle 100 based on vehicle 100 dimensions, shape, etc. For example, the vehicle 100 windshield location relative to the vehicle 100 center 150 may be higher in a truck compared to a passenger car. Thus, the computer 110 may be programmed to determine the risk further based on the vehicle 100 shape, dimensions, etc. and the ice 230 trajectory. Additionally, the computer 110 may be programmed to determine the risk based on the determined dimensions of the ice 230. A larger ice 230 may cause more damages to the vehicle 100 compared to a smaller ice 230.

The computer 110 may be programmed to determine a risk of an ice 230 strike based on a location and dimensions of a building such as a bridge, tunnel, etc. For example, the computer 110 may be programmed to forecast an ice 230 strike based on a height of a bridge, a height of the second vehicle 200, and dimensions of the ice 230. For example, the computer 110 may determine that an ice 230 on top of the second vehicle 200 may fall down upon determining that a sum of a height of ice 230 and a height of the second vehicle 200 exceeds a height of the bridge. The computer 110 may be programmed to determine bridge dimensions based on map data and/or the sensor 130 data, e.g., LIDAR sensor 130 data.

The computer 110 may be programmed to transmit a message to another vehicle based on the determined risk. For example, as shown in FIG. 2C, the ice 230 from the second vehicle 200 may strike the third vehicle 260. The vehicle 100 computer 110 may be programmed to transmit a message to the third vehicle 260 including trajectory 240d data. The vehicle 100 may be programmed to determine whether to send the message based on the trajectory 240d and the third vehicle 260 location, speed, direction, etc. In other words, the computer 110 may determine a risk of ice 230 striking the third vehicle 260 and transmit the message upon determining that a risk of ice 230 striking the third vehicle 260 exceeds a predetermined threshold, e.g., 70%.

The computer 110 may be programmed to transmit a message to the second vehicle 200 that includes a maximum recommended acceleration, and/or a maximum recommended deceleration threshold for the second vehicle 200. Thus, advantageously, a risk of an ice 230 strike may be reduced, e.g., by reducing a likelihood of ice 230 detachment from the second vehicle 200 by restricting the second vehicle 200 acceleration and/or deceleration. The computer 110 may be programmed to determine a maximum recommended acceleration/deceleration threshold for the second vehicle 200 based on current weather conditions, e.g., a wind speed, a speed of the second vehicle 200, lane 210 curvature, dimensions of the ice 230, etc.

The computer 110 may be programmed to broadcast a message including current operating parameters, e.g., location coordinates, speed, direction, etc., of the second vehicle 200 upon determining that the determined risk exceeds a predetermined threshold. Thus, advantageously, other vehicles such as the third vehicle 260 may adjust their speed, driving route, etc., based on the received message.

The vehicle 100 may be programmed to detect an ice 230 strike based on the received sensor 130 data. For example, the computer 110 may be programmed to detect an ice 230 strike based on data received from the camera sensor 130, the LIDAR sensor 130, etc. As another example, the computer 110 may be programmed to detect an ice 230 strike based on data received from pressure and/or accelerator sensor 130 disposed in the vehicle 100 body. The computer 110 may be further programmed to transmit a message to the third vehicle 260 including information about an ice 230 strike to the vehicle 100.

Processing

Figure 3:
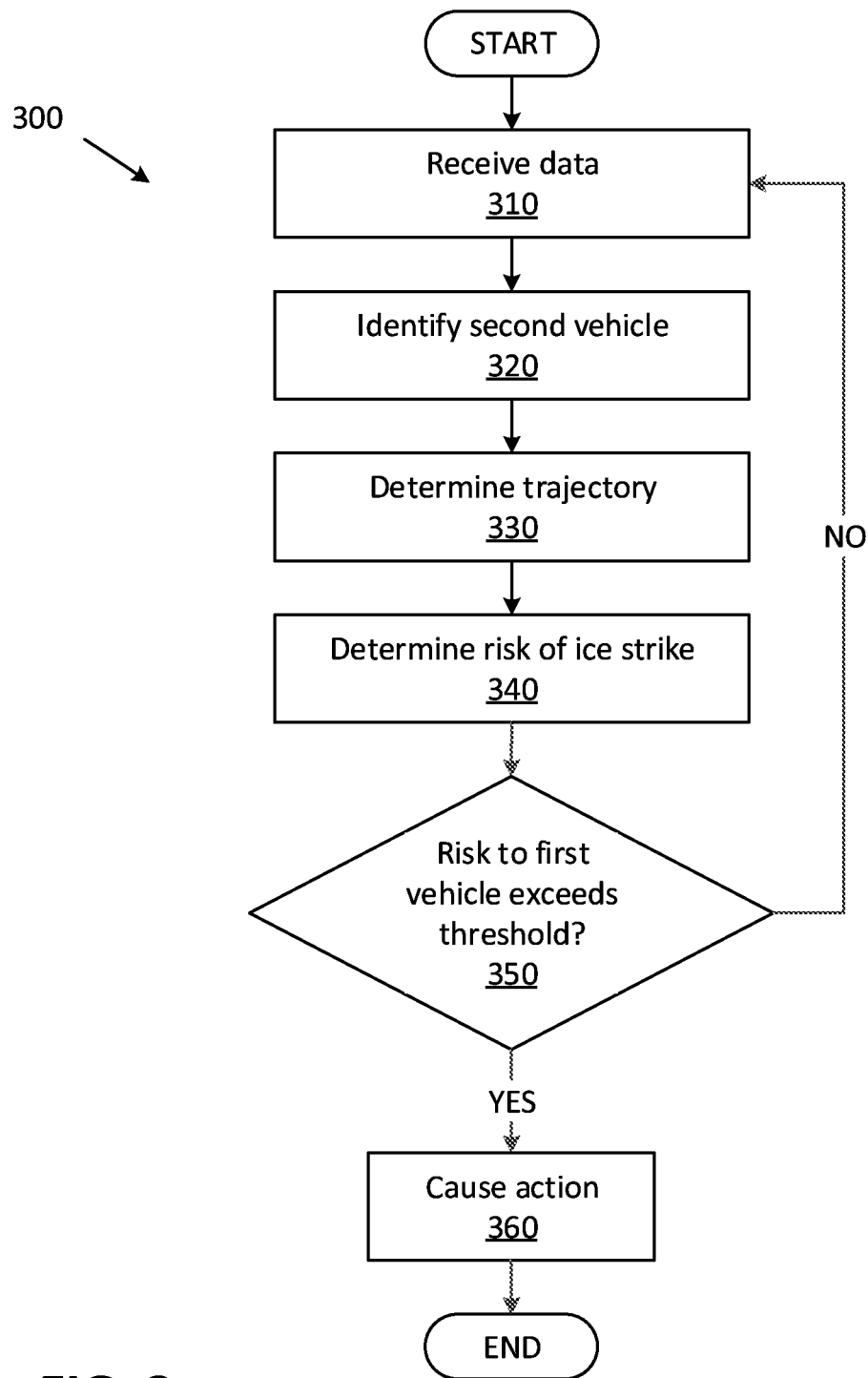
FIG. 3 is a flowchart of an exemplary process for a vehicle to predict an ice strike to the vehicle.

FIG. 3 is a flowchart of an exemplary process 300 for a vehicle 100 to predict an ice 230 strike to the vehicle 100. For example, the vehicle 100 computer 110 may be programmed to execute blocks of the process 300.

The process 300 begins in a block 310, in which the computer 110 receives data including sensor 130 data, environmental data, etc. The computer 110 may receive data from vehicle 100 sensors 130, a remote computer, other vehicles 200, 260, etc.

Next, in a block 320, the computer 110 identifies other vehicles, e.g., a second vehicle 200. The computer 110 may be programmed to identify the second vehicle 100 based on vehicle 100 sensor 130 data such as the LIDAR sensor 130, and/or data received from the second vehicle 200, e.g., location coordinates, via a V-to-V communication network.

Next, in a block 330, the computer 110 determines a trajectory of an ice 230 strike. For example, the computer 110 determines a trajectory 240a (see FIG. 2A) based on vehicle 100 sensor 130 data, environmental data (e.g., outside temperature, rate of temperature change over a period of time, weather conditions, etc.), map data (e.g., road curvature), etc.

Next, in a block 340, the computer 110 determines a risk of ice 230 strike. In one example, the computer 110 determines a risk of ice 230 strike to the vehicle 100 based on the determined trajectory, a likelihood of ice 230 detachment from the second vehicle 200, etc. In another example (see FIG. 2C), the computer 110 may be programmed to determine a risk of ice 230 striking a third vehicle 260 based on the determined trajectory, and third vehicle 260 location coordinates, speed, direction, etc.

Next, in a decision block 350, the computer 110 determines whether the determined risk is greater than a risk threshold, e.g., 50%, "medium", etc. In one example, the computer 110 may be programmed to determine whether the risk of an ice 230 strike to the vehicle 100 exceeds the predetermined threshold. In another example, the computer 110 may be programmed to determine whether the risk of ice 230 strike to the vehicle 100 is greater than a first threshold, e.g., 50%, or a risk of an ice 230 strike to a third vehicle 260 is greater than a second threshold, e.g., 60%. If the computer 110 determines that the determined risk is greater than the risk threshold, then the process 300 proceeds to a block 360; otherwise the process 300 returns to the block 310.

In the block 360, the computer 110 instructs an action. For example, the computer 110 may be programmed to actuate a vehicle 100 actuator 120 to accelerate, brake, change lane 210, etc. Additionally or alternatively, the computer 110 may be programmed to transmit a message to the second vehicle 200 including a maximum recommended acceleration and/or deceleration for the second vehicle 200. Additionally or alternatively, where the risk of an ice 230 strike to a third vehicle 260 exceeds the second threshold, the computer 110 may be programmed to transmit a message to the third vehicle 260 including trajectory 240d data, and/or the second vehicle 200 location coordinates, speed, direction, etc.

Following the block 360, the process 300 ends, or alternatively, returns to the block 310, although not shown in FIG. 3.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor programmed to:
   identify, in a first vehicle, a second vehicle based on first vehicle sensor data;
   determine a trajectory of ice falling from the second vehicle, based on at least one of the sensor data and additional environmental data;
   determine, a risk of the ice from the second vehicle striking the first vehicle based at least in part on the determined trajectory; and
   cause an action in the first vehicle based on the determined risk.

2. The computer of claim 1, wherein the action in the first vehicle includes changing a first vehicle driving lane.

3. The computer of claim 1, the processor further programmed to transmit a message to the second vehicle based on the determined risk.

4. The computer of claim 3, wherein the message includes at least one of a maximum recommended acceleration and a maximum recommended threshold for the second vehicle.

5. The computer of claim 1, wherein the action in the first vehicle includes broadcasting a message including location, movement direction, and speed of the second vehicle upon determining that the determined risk exceeds a predetermined threshold.

6. The computer of claim 1, wherein the action in the first vehicle includes closing a protective cover of a first vehicle sensor.

7. The computer of claim 1, wherein determining the risk further depends on a location, a movement direction, and a speed of the second vehicle.

8. The computer of claim 1, further programmed to determine the risk by:
   identifying ice attached to the second vehicle based on the sensor data; and
   estimating a trajectory of the ice.

9. The computer of claim 1, wherein the environmental data include weather data.

10. The computer of claim 1, further programmed to determine the risk by determining whether the second vehicle comes from a snowy area based on weather data, a second vehicle location, a second vehicle movement direction, a second vehicle speed, and map data.

11. The computer of claim 1, further programmed to:
    detect the ice on the second vehicle based on at least one of the sensor data and additional environmental data;
    estimate a time of detachment for the ice based on at least one of the sensor data and additional environmental data;
    determine the trajectory of the ice falling from the second vehicle, based on at least one of the estimated time of detachment, an acceleration of the second vehicle, a speed of the second vehicle, and a road curvature;
    estimate a time and location of ice landing based on the determined trajectory; and
    determine the risk of the ice from the second vehicle striking the first vehicle based on the estimated time and location of ice landing, a speed of the first vehicle, and an acceleration of the first vehicle.

12. A method, comprising:
    identifying, in a first vehicle, a second vehicle based on first vehicle sensor data;
    determining, a trajectory of ice falling from the second vehicle, based on at least one of the sensor data and additional environmental data;
    determining, a risk of the ice from the second vehicle striking the first vehicle based at least in part on the determined trajectory; and
    causing an action in the first vehicle based on the determined risk.

13. The method of claim 12, wherein the action in the first vehicle includes changing a first vehicle driving lane.

14. The method of claim 12, further comprising transmitting a message to the second vehicle based on the determined risk, the message including at least one of a maximum recommended acceleration and a maximum recommended threshold for the second vehicle.

15. The method of claim 12, wherein the action in the first vehicle includes broadcasting a message including location, movement direction, and speed of the second vehicle upon determining that the determined risk exceeds a predetermined threshold.

16. The method of claim 12, wherein the action in the first vehicle includes closing a protective cover of a first vehicle sensor.

17. The method of claim 12, wherein determining the risk further depends on a location, a movement direction, and a speed of the second vehicle.

18. The method of claim 12, wherein determining the risk further includes identifying ice attached to the second vehicle based on the sensor data; and estimating a trajectory of the ice.

19. The method of claim 12, wherein the environmental data include weather data.

20. The method of claim 12, wherein determining the risk further includes determining whether the second vehicle comes from a snowy area based on weather data, a second vehicle location, a second vehicle movement direction, a second vehicle speed, and map data.

* * * * *